United States Patent
Nakagawa et al.

(10) Patent No.: US 6,530,025 B1
(45) Date of Patent: Mar. 4, 2003

(54) NETWORK CONNECTION CONTROLLING METHOD AND SYSTEM THEREOF

(75) Inventors: Itaru Nakagawa, Kanagawa (JP); Takashi Nishigaya, Kanagawa (JP); Ichiro Iida, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/234,471

(22) Filed: Jan. 21, 1999

(30) Foreign Application Priority Data

May 27, 1998 (JP) .......................................... 10-146200

(51) Int. Cl.$^7$ ............................. G06F 12/00; H02H 3/05
(52) U.S. Cl. ......................... 713/201; 713/200; 380/25
(58) Field of Search .............................. 713/201, 200; 380/25

(56) References Cited

U.S. PATENT DOCUMENTS

| | | | |
|---|---|---|---|
| 5,764,890 A | 6/1998 | Glasser et al. | 395/188.01 |
| 6,289,344 B1 * | 9/2001 | Braia et al. | 707/9 |
| 6,308,182 B1 * | 10/2001 | Nishigaya et al. | 707/103 |

FOREIGN PATENT DOCUMENTS

| | | |
|---|---|---|
| EP | 0829991 A2 | 3/1998 |
| EP | 0841616 A2 | 5/1998 |
| EP | 0875814 A2 | 11/1998 |
| EP | 0930567 A2 | 7/1999 |
| WO | WO 97/34426 | 9/1997 |

OTHER PUBLICATIONS

S.D. Hubbard et al., "Firewalling the Net", BT Technology Journal, vol. 15, No. 2, Apr. 1, 1997 pp. 94–106.
Stefanos Gritzalis, et al., Security Issues Surrounding Programming Languages for Mobile Code: JAVA vs. Safe–Tel, Operating Systems Review, vol. 32, No. 2, Apr. 1, 1998.
P.C. Cheng, et al., "A Security Architecture For the Internet Protocol", IBM Systems Journal, No. 37, vol. 1, 1998.

* cited by examiner

*Primary Examiner*—Norman M. Wright
(74) *Attorney, Agent, or Firm*—Staas & Halsey L.L.P.

(57) ABSTRACT

An authentication checking server makes user authentication checking when an access is made to an individual in-house server. A resource managing server receives a resource request corresponding to the resource of the individual server, calculates the access right to the corresponding resource based on the resource request and the result of the authentication checking, and relays the calculated access right and the resource request to the individual server. Upon receipt of the access right and the resource request, the individual server transmits the resource as a mobile code. A client machine receives and executes the mobile code, whereby an encryption access is made to the resource of the individual server included in an in-house network via the relay agent generated within the client machine.

13 Claims, 12 Drawing Sheets

FIG. 10

```
//HOST NAME OF AUTHENTICATION CHECKING SERVER WHERE GATE KEEPER IS RUNNING          ──→ STEP 1
String CertServer = "cert.server.domain";
//WINDOW APPEARS AFTER CONNECTION IS MADE TO GATE KEEPER.  INPUTTING ID AND PASSWORD ──→ STEP 2
//
int port = GetCertification(CertServer,1021);
if ( port != -1)
{
//REQUESTING RELAY AGENT PROGRAM IF AUTHENTICATION IS SUCCESSFULLY MADE.  READ/WRITE/EXECUTION IS DESIRED. ──→ STEP 3
EncryptedAgent ea = send (CertServer, port, request, "rwx");
if(ea != null)  //IF RELAY AGENT IS OBTAINED AS ENCRYPTED MOBILE CODE               ──→ STEP 4
{
  RelayAgent ra = decrypt(ea); //DECODING MOBILE CODE AND OBTAINING RELAY AGENT     ──→ STEP 5
  ra.exec();  //REPRODUCING IN-HOUSE RESOURCE ON CLIENT BY EXECUTING RELAY AGENT    ──→ STEP 6
}
}
```

```
//GATE KEEPER
Socket s = new Socket(1021);
Reliability border;
while(1)
{
    Request q = s.accept();                      //RECEIVING AUTHENTICATION CHECKING     ——STEP 1
    Certification c = certify(q);                //AUTHENTICATION CHECKING                ——STEP 2
    Reliability r = calc_reliability(c);         //CALCULATING DEGREE OF RELIABILITY      ——STEP 3
    if ( r > border )       //IF DEGREE OF RELIABILITY IS HIGHER THAN THRESHOLD          ——STEP 4
                                                                                          ——STEP 5
    {
        int port = random(); //DYNAMICALLY DETERMINING RESOURCE REQUEST PORT              ——STEP 6
        //ACTIVATING RELAY SERVER FOR RELAYING REQUEST FROM CLIENT TO RESOURCE MANAGING SERVER  ——STEP 7
        RelayServer rs = new RelayServer(port);
        //NOTIFYING CLIENT OF PORT NUMBER FOR TRANSMITTING REQUEST TO RESOURCE MANAGING SERVER  ——STEP 8
        if(rs!=null) return(port)
    }
}
```

FIG. 11

```
//RESOURCE MANAGER
Socket s = new Socket(1022);
while(1)
{
    Request q = s.accept();           //RECEIVING RESOURCE REQUEST        ——STEP 1
    PersedRequest p = parse(q);       //REQUEST PARSING                   ——STEP 2
    AccessRight r = Calc_AccessRight(p);  //CALCULATING ACCESS RIGHT      ——STEP 3
    if( r > NO)       //IF PERMISSIBLE ACCESS RIGHT IS OBTAINED           ——STEP 4
    {
        //ISSUING REQUEST TO INDIVIDUAL SERVER WHICH PROVIDES SERVICE, AND OBTAINING RELAY AGENT
        RelayAgent ra = send(p.Server.host, p.server.port, p, r);         ——STEP 5
        //RETURNING RELAY AGENT TO CLIENT VIA RELAY SERVER OF AUTHENTICATION SERVER HOST
        if(ra!=null) return(ra);                                          ——STEP 6
    }
}
```

F I G. 1 2

NETWORK CONNECTION CONTROLLING METHOD AND SYSTEM THEREOF

BACKGROUND OF THE INVENTION

1. Field of the Invention

The present invention relates to a firewall technique for interconnecting the Internet and a LAN (Local Area Network), and for securely protecting the resources within the LAN while permitting accesses made from the Internet to the LAN.

2. Description of the Related Art

Conventionally, a firewall was arranged with a packet filtering method or a filtering method as an application gateway. These methods are intended to determine whether or not to permit an access from an outside to an inside for each service.

With the firewall for protecting in-house resources from an illegal attack from outside when an in-house LAN is connected to the Internet, all accesses are prohibited by default, and only a particular individual access is permitted.

Therefore, with the current filtering method which respectively recognizes a service and a user as first and second standards, almost all network services become unavailable and even legal users cannot receive useful Internet services.

If network services are made available outside and inside a company depending on need in order to satisfy the recently diversified demands of in-house users, data from many services are allowed to pass through the firewall. As a result, it becomes difficult to maintain security.

Additionally, using a remote access method which is currently becoming popular, login to an in-house LAN machine is permitted after authentication checking is made. Accordingly, even a single attack can possibly cause serious damage.

As described above, with the conventional methods, if the number of services which can externally use in-house resources increases, the possibility that the in-house resources, which must be protected, can be exposed to danger becomes great.

SUMMARY OF THE INVENTION

This invention was developed in the above described background, and aims at significantly improving the degree of convenience of a firewall, and at securing a security level equivalent to that of a conventional technique by changing a filtering method.

The present invention assumes a network connection trolling method for interconnecting an external work (a network outside a company) and a local area network (a network inside a company).

According to the present invention, authentication checking is made for a user within an external network user of a client machine 301) when the user accesses a local area network (an authentication checking server 101).

Next, a resource request to access a resource within the local area network is received from the user based on the result of the authentication checking (a resource managing server 102).

Then, an access right to the resource within the local area network, which is requested by the resource request, is calculated based on the resource request and the result of the authentication checking (the resource managing server 102).

As a result, an access to the resource is made based on the calculated access right (the resource managing server 102).

Here, the accessed resource is transmitted as a mobile code to the client machine operated by the user. The client machine access the data within the resource by receiving and executing the mobile code.

According to the present invention, filtering is performed by recognizing a user and a service as first and second standards, so that it becomes possible to protect in-house resources from external attacks and to satisfy the diversified demands of in-house users in accordance with the respective policies for respective users, that is, all company employees are permitted to make any accesses by default, while external users are prohibited from making any accesses by default.

Additionally, a change is made from the conventional method for permitting login to a machine within an in-house network after authentication checking is made, to the method for externally transmitting only a requested in-house resource, thereby making the scale of damage which can possibly occur with a single attack less than that of a conventional technique.

More specifically, the distinction between text information such as electronic mail received within a company, multimedia information, etc., and the application program data of a system under development, is not made, and they are defined to be in-house resources. The applications inside and outside the company can be linked and operate together.

As described above, according to the present invention, the degree of convenience of a firewall can be significantly improved by changing a filtering method, and moreover, the security mechanism is duplicated by checking user authentication and controlling each access to in-house resources, thereby ensuring the security level equivalent to that of a conventional technique.

BRIEF DESCRIPTION OF THE DRAWINGS

One skilled in the art can easily understand additional features and objects of this invention from the description of the preferred embodiment and some of t attached drawings, in which:

FIG. 10 exemplifies a client application program;

FIG. 11 exemplifies a gate keeper program; and

FIG. 12 exemplifies a resource manager program.

DESCRIPTION OF THE PREFERRED EMBODIMENT

Provided below is the explanation about the details of the preferred embodiment according to the present invention.

<Characteristics of the Preferred Embodiment According to the Present Invention>

This preferred embodiment is characterized in that filtering is performed by respectively recognizing a user and a service as first and second standards, so that it becomes possible to protect in-house resources from external attacks, and also to satisfy the diversified demands of in-house users in accordance with the respective policies for respective users, that is, company employees are permitted to make any accesses by default, while external users are prohibited from making any accesses by default.

Additionally, this preferred embodiment is characterized in that the scale of damage which can be possibly caused by a single attack can be made less than that of a conventional technique by changing the conventional method for permitting login to a machine included in an in-house network after authentication checking is made, to the method for transmitting only a requested in-house resource.

More specifically, according to this preferred embodiment, the distinction between in-house resources, for example, between text information such as electronic mail received within a company, multimedia information, etc., and the application program data of a system under development, is not made, and an application possessed inside the company is defined to be one of the in-house resources, whereby applications inside and outside the company can be linked and operate together.

As described above, according to this preferred embodiment, the degree of convenience of a firewall can be significantly improved by changing a filtering method, and additionally, the security mechanism is duplicated by checking user authentication and by controlling each access to in-house resources, thereby ensuring the security level equivalent to that of a conventional technique.

<Configuration of the Preferred Embodiment According to the Present Invention>

Figure 1:
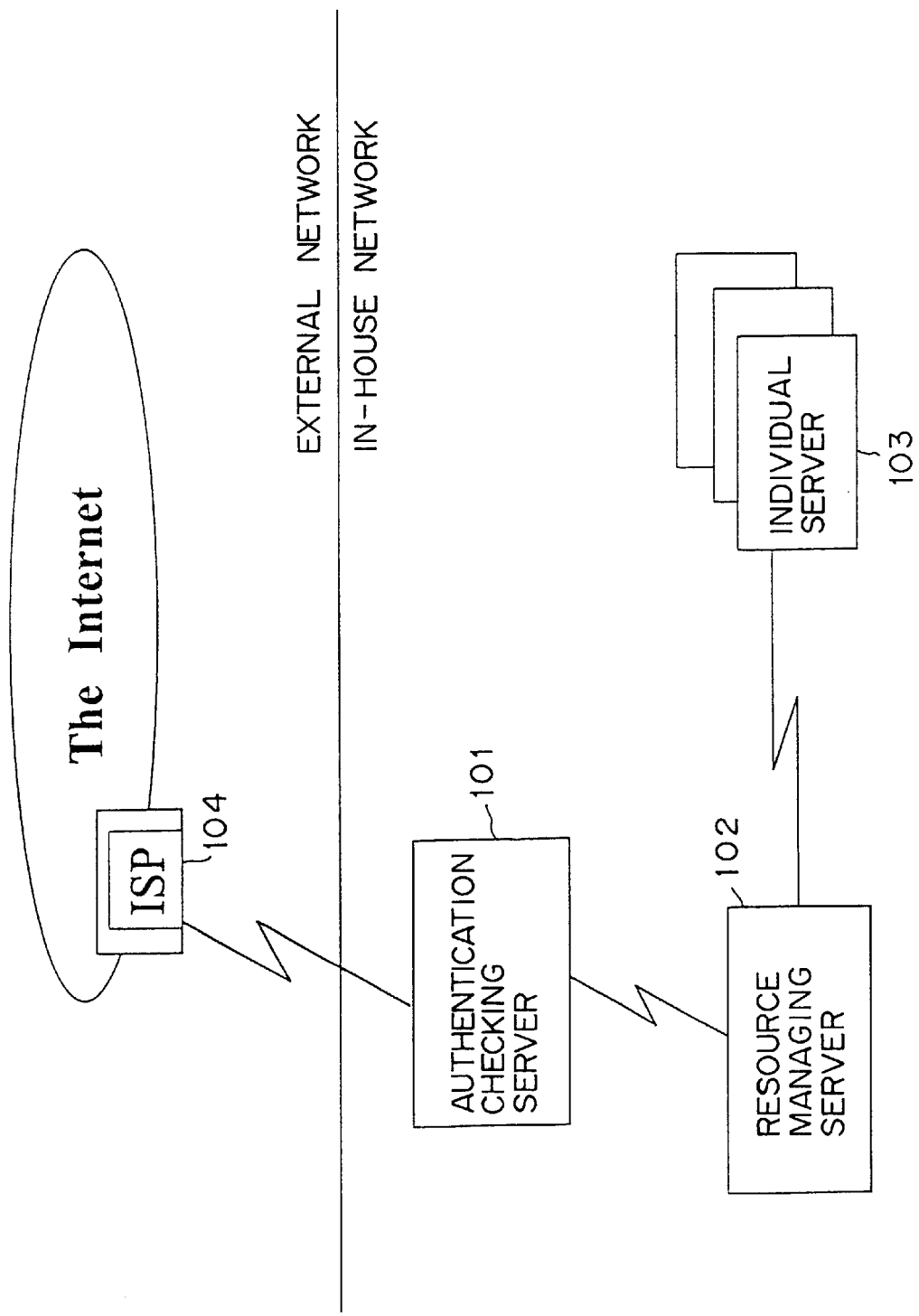
FIG. 1 is a block diagram showing the configuration of a system according to a preferred embodiment of the present invention (No. 1)

FIG. 1 is a block diagram showing the configuration of the system according to the preferred embodiment of the present invention.

An authentication checking server 101, which is arranged within an in-house network, comprises at least one service request port for receiving a plurality of types of service requests such as telnet, ftp, http, etc., and has a mechanism for checking user authentication. This server 101 is connected to the Internet via an ISP (Internet Service Provider) 104 included in an external network.

A resource managing server 102, which is arranged within the in-house network, has a capability for managing the resources within the in-house network, and has a mechanism for restricting an access right to each of the in-house resources depending on the attribute or the degree of reliability of a user. This server 102 is connected to the authentication checking server 101.

Figure 2:
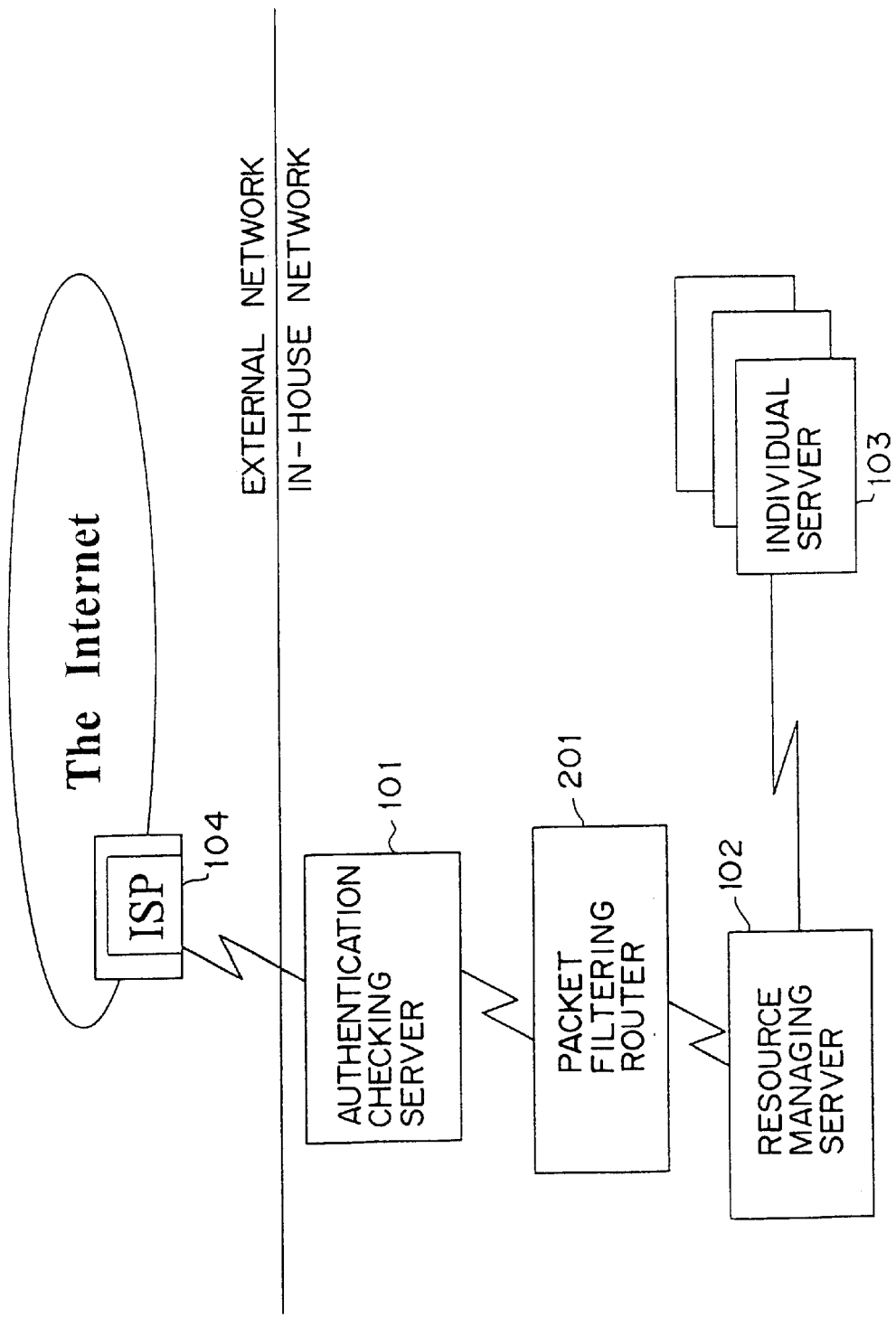
FIG. 2 is a block diagram showing the configuration of the system according to the preferred embodiment of the present invention (No. 2)

Note that the resource managing server 102 and the authentication checking server 101 may be directly connected as shown in FIG. 1, or may be connected via a packet filtering router 201 as shown in FIG. 2.

An individual server 103, which is arranged within the in-house network, provides a variety of services such as telnet, ftp, http, etc. This server 103 may be the same server as the resource managing server 102.

<Principle of the Operations According to the Preferred Embodiment of the Present Invention>

Provided next is the explanation about the principle of the operations of the configuration according to the above described preferred embodiment.

A user ID and an authentication password are registered to the authentication checking server 101 beforehand.

If a user ID is not registered to the authentication checking server 101, the corresponding user is recognized to be an external user.

A pass-phrase or an one-time password, etc., which are used by a public key encrypting system, can be adopted as the authentication password, while an electronic mail address is adopted as the user ID.

A user who desires to access an in-house resource makes a connection to the authentication checking server 101, and transmits a service request, the user ID, and the authentication password to the authentication checking server 101.

The authentication checking server 101 which has received the service request calculates the degree of reliability of the user by making a matching between the received user ID and authentication password, and the registered user ID and authentication password.

The authentication checking server 101 then opens a port (socket) for a client machine as the preparation for accepting the resource request.

The client machine transmits the logical name of a desired in-house resource to the port as a resource request. The resource specification is made with a URL (Uniformed Resource Locator) method.

The authentication checking server 101 transmits to the resource managing server 102 the resource request transmitted from the client machine and the degree of reliability of the user, which is calculated beforehand.

Upon receipt of the resource request and the degree of reliability of the user from the authentication checking server 101, the resource managing server 102 detects the individual server 103 which provides the specified in-house resource, according to the logical name of the in-house resource included in the resource request. Furthermore, the resource managing server 102 determines an access right to the requested in-house resource according to the degree of reliability of the user, which is received from the authentication checking server 101, transmits the resource request and the access right to the individual server 103, and requests the program code (mobile code) which provides the requested in house resource.

The individual server 103 which receives the resource request, the access right from the resource managing server 102 generates the mobile code, and embeds requested resource, program for accessing the resource the individual settings such as the access right received from the resource managing server 102, a client identification code, the expiry date of the program, etc. in the generated mobile code. Then, the individual server 103 returns the mobile code to the resource managing server 102.

Upon receipt of the mobile code from the individual server 103, the resource managing server 102 returns it to the authentication checking server 101.

Upon receipt of the mobile code from the resource managing server 102, the authentication checking server 101 encrypts the mobile code by using the registered password (such as a public key, etc.) of the user who has issued the resource request, and returns the encrypted mobile code to the client machine which has issued the resource request.

The client machine which has received the encrypted mobile code extracts the secret key of the user by using the pass-phrase that the user has transmitted to the authentication checking server 101 at the time of the authentication checking, decrypts the encrypted mobile code with the secret key, and executes the program of the mobile code. Consequently, the in-house resource requested by the user is reproduced on the client machine.

The in-house resource reproduced on the client machine rejects an access request which violates the access right by referencing the access right and the client identification code, which are embedded in the resource itself.

<Specific Operations According to the Preferred Embodiment of the Present Invention>

Sequentially provided below are the explanations about the specific operations according to the preferred embodiment of the present invention, by referring to the schematic diagrams explaining the operations shown in FIGS. 3 through 6, the sequences shown in FIGS. 7 through 9, and the program examples shown in FIGS. 10 through 12.

The explanations to be provided below assume that the authentication checking by the authentication checking server 101 is made based on the public key encrypting system, a pass-phrase is used as the authentication password, and an electronic mail address is used as the user ID.

The authentication checking server 101 has a pair of the electronic mail address and the public key of a user as user information.

Figure 3:
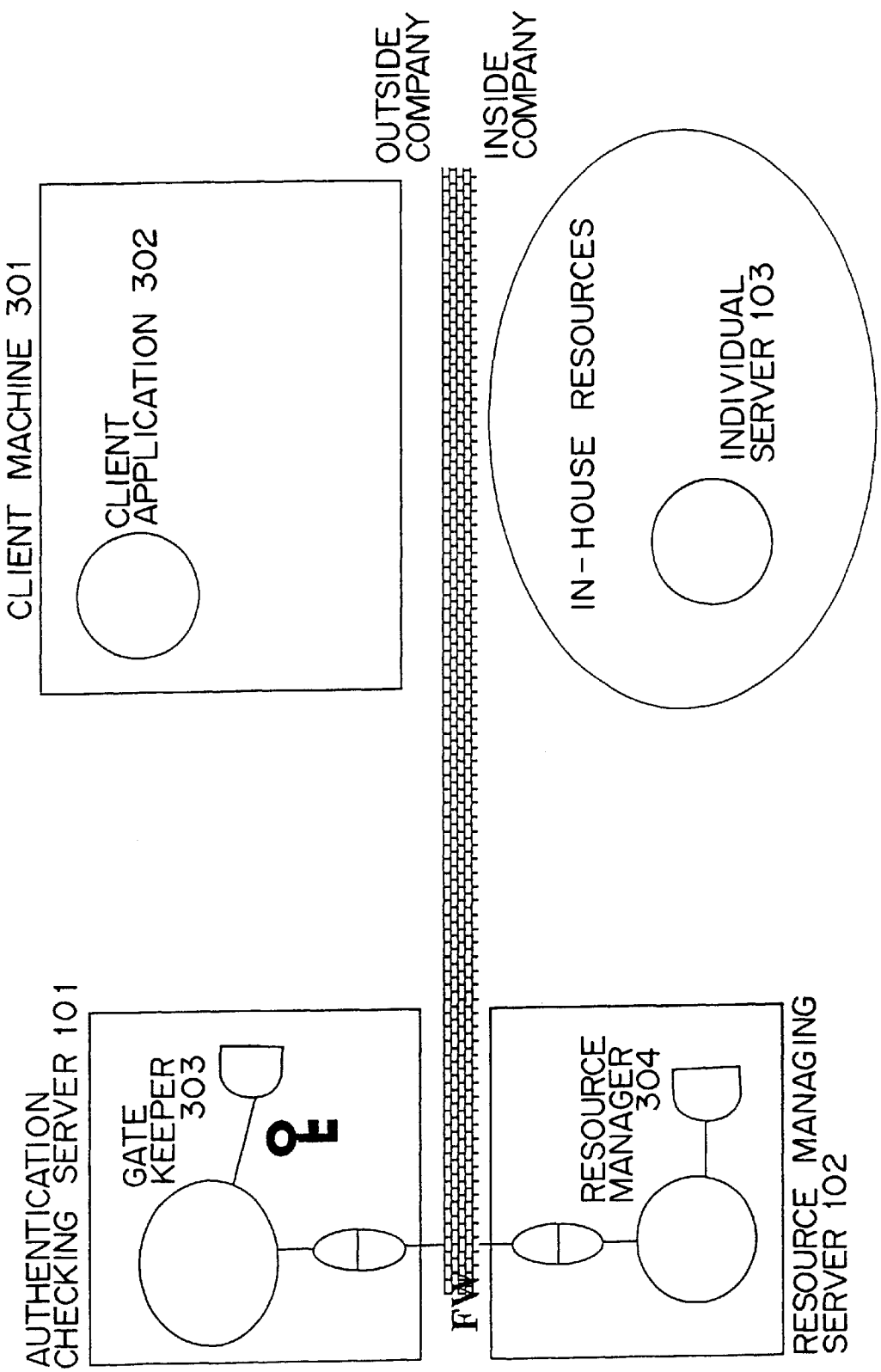
FIG. 3 is a schematic diagram explaining the operations according to the preferred embodiment of the present invention (No. 1)

In the authentication checking server 101, a gate keeper 303, as shown in FIG. 3, which is a server program for making the authentication checking, leaves only the authentication checking port (socket) open. Whatever network service is used, the connection to this port is first made, and then the authentication checking is made. When the gate keeper 303 opens the above described port, for example, the program code shown in step 1 of FIG. 11 is executed.

Figure 7:
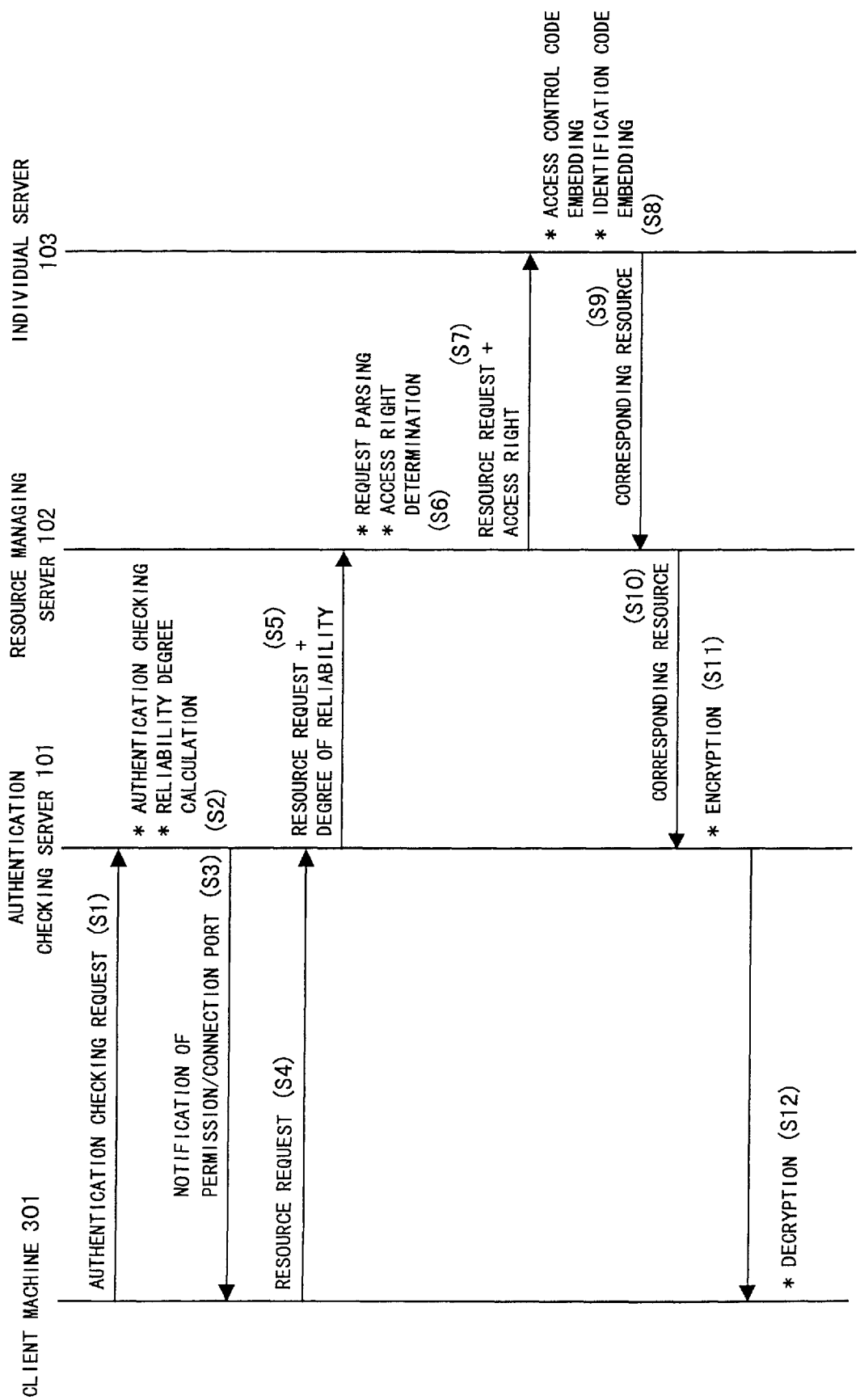
FIG. 7 shows the sequence for establishing a service between a client and a server.

If a user requests a network service within an in house network by executing a client application 302 (FIG. 3) of a client machine 301, an authentication checking request is first issued from the client machine 301 to the authentication checking server 101 (SI of FIG. 7). In this case, the client application 302 executes, for example, the program codes shown in steps 1 and 2 of FIG. 10. The authentication checking server 101 is specified in step 1, while the connection to the authentication checking port of the authentication checking server 101 is made in step 2.

If the connection to the authentication checking server 101 is successfully made, the user inputs his or her user ID and authentication password by using the window displayed on the client machine 301. The user ID is the electronic mail address of the user, while the authentication password is the pass-phrase used when the public and secret keys are generated.

Upon receipt of the user ID and the authentication password from the client machine 303, the gate keeper 303 included in the authentication checking server 101 decrypts the authentication password by using the public key of the user, and determines whether or not the received user ID is registered to a user database, which is not shown in FIG. 3 but is included in the authentication checking server 101, and whether or not the received authentication password matches any authentication password stored in the user database, if the user ID is registered (S2 of FIG. 7). In this case, the gate keeper 303 executes, for example, the program codes shown in steps 2 and 3 of FIG. 11. The process for receiving the user ID and the authentication password is performed in step 2, while the process for checking authentication is performed in step 3.

Next, the gate keeper 303 calculates the degree of reliability of the user by referencing the above described user database with the result of the authentication checking (S2 of FIG. 7). In this case, the gate keeper 303 executes, for example, the program code shown in step 4 of FIG. 11.

If the electronic mail address of the user, which is the user ID, is registered to the user database and if the authentication password is legal, a high degree of reliability is provided to the user so that he or she can use many services.

If the user ID is not registered to the user database, this user is recognized to be an external user and a low degree of reliability is provided to the user. In this case, only services which do not require the authentication checking, such as the acceptance of electronic mail addressed to an in-house user, etc. are provided.

If the authentication password is illegal although the user ID is registered to the user database, this access is determined to be an attack and is rejected.

If the authentication checking is properly made, the gate keeper 303 secures the port (socket) for accepting the resource request issued from the user (permission/connection port), and activates a relay server for relaying resource associated information, which is communicated between the client machine 301 and the resource managing server 102, in correspondence with the secured port. Then, the gate keeper 303 notifies the client machine 301 of the above described permission/connection port (S3 of FIG. 7). In this case, the gate keeper 303 executes, for example, the program codes shown in steps 5 through 8 of FIG. 11. In step 5, it is determined whether or not the degree of reliability is higher than a threshold. In step 6, the number of the permission/connection port is dynamically secured. In step 7, the relay server using this port number is activated. In step 8, the above described port number is notified to the client machine 301 if the relay server is successfully activated.

When the permission/connection port is notified from the authentication checking server 101, the client application 302 executed by the client machine 301 assembles the resource request in a predetermined data format, extracts the secret key by receiving from the user the pass-phrase for extracting the secret key of the user, and encrypts the resource request with the secret key. Then, the client application 302 transmits the encrypted resource request by using the notified port (S4 of FIG. 7). In this case, the client application 302 executes, for example, the code shown in step 3 of FIG. 10.

The relay server, which is operated by the authentication checking server 101, decrypts the resource request received from the client machine 301 with the public key corresponding to the user who has transmitted the request, embeds in the decrypted resource request the degree of reliability, which is calculated for this user (S2 of FIG. 7), and transmits the resource request to the resource managing server 102 (S5 of FIG. 7).

The resource manager 304 (shown in FIG. 3), which is operated by the resource managing server 102, has the mechanism for providing an external user via an external network with the directory for searching for the individual server 103 which provides the in-house resource corresponding to the logical name of an in-house resource, and for determining the access right from the client machine 301 to the in-house resource.

More specifically, the resource managing server 102 parses the resource request, extracts the resource name and the degree of reliability of the user, and calculates the access right to the resource by using the extracted information, upon receipt of the resource request from the authentication checking server 101 (S6 of FIG. 7). The access right includes, for example, the right to perform a read/write operation for an in-house user, the right to perform only a read operation for an external user, the right to prohibit an access to a confidential resource for an external user, etc. In this case, the resource manager 304 executes, for example, the program codes shown in steps 1 through 3 of FIG. 12. In step 1, the process for receiving a resource request is performed. In step 2, a data set "p", which includes the resource name and the degree of reliability of a user, is extracted by performing the process for parsing the received resource request. In step 3, the process for calculating the access right to the data set "p" is performed.

Note that the determination of the access right may be made by the individual server 103.

Next, the resource managing server 102 searches for the individual server 103 which provides the network service corresponding to the parsed resource request, transmits the parsed resource request and the access right to the searched individual server 103, and requests the relay agent which is the above described mobile code for providing the requested in-house resource (S7 of FIG. 7). In this case, the resource manager 304 executes, for example, the program codes shown in steps 4 and 5 of FIG. 12. It is determined whether or not a permissible access right can be obtained in step 4, while the resource request, the access right, and the request of the relay agent are transmitted to the individual server 103 in step 5.

The individual server 103, which has received the resource request, the access right, and the request of the relay agent from the resource managing server 102, generates the requested relay agent, and embeds in the generated relay agent the individual settings such as the access right received from the resource managing server, the client identification code, the expiry date of the program, etc. (S8 of FIG. 7). This relay agent is written as a mobile code, for example, in JAVA provided by Sun Microsystems. The relay agent can freely move within in-house and external networks, and includes the contents of an in-house resource and the interface (method) for accessing the contents.

Figure 4:
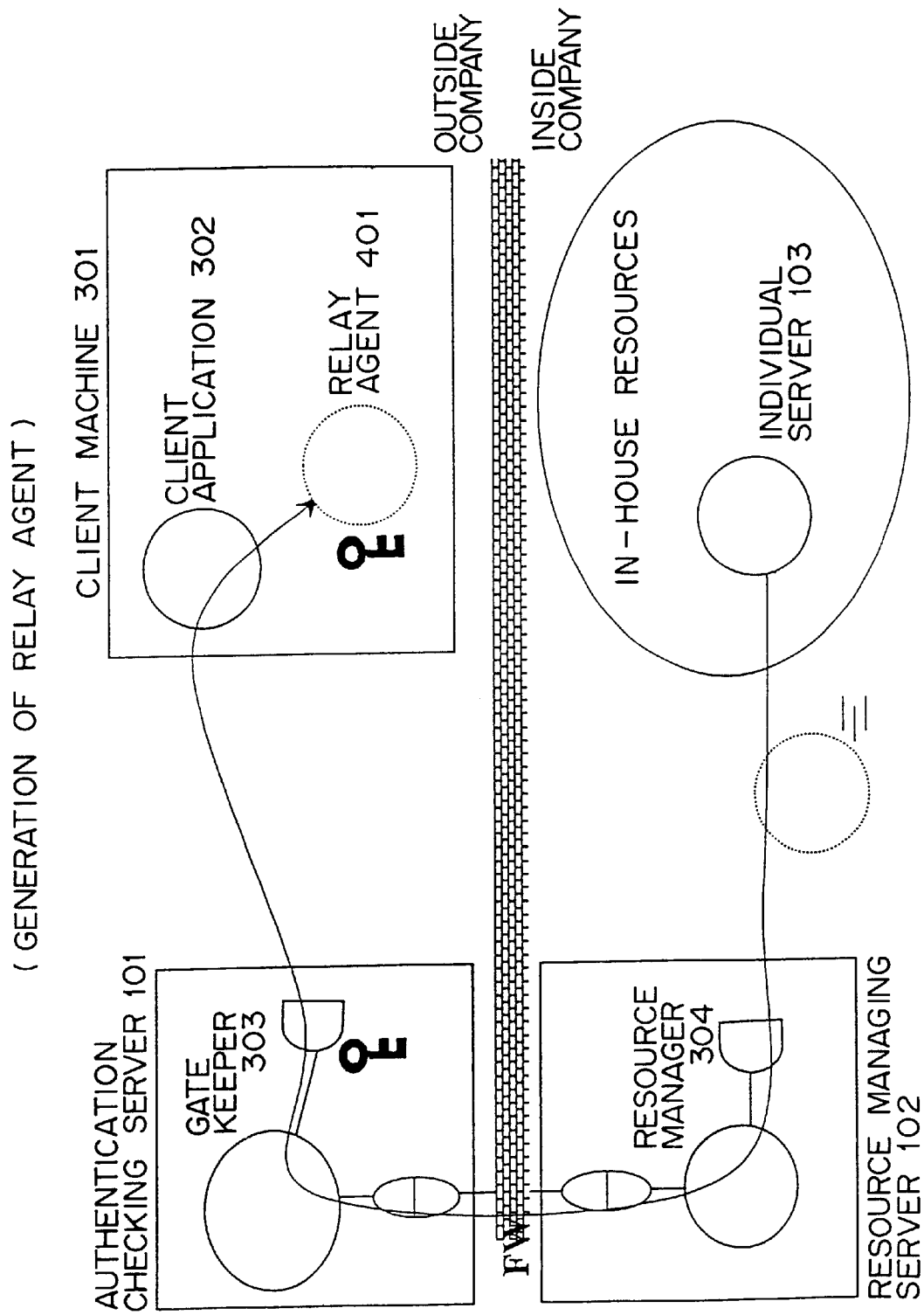
FIG. 4 is a schematic diagram explaining the operations according to the preferred embodiment of the present invention (No. 2)

The individual server 103 then returns the relay agent to the resource managing server 102 as shown in FIG. 4 (S9 of FIG. 7).

Upon receipt of the relay agent, the resource manager 304 operated by the resource managing server 102 returns the relay agent to the authentication checking server 101 (S10 of FIG. 7). In this case, the resource manager 304 executes, for example, the program code shown in step 6 of FIG. 12.

Upon receipt of the relay agent, as shown in FIG. 4, the above described relay server operated by the authentication checking server 101 encrypts the relay agent with the registered public key of the user who has transmitted the resource request (the key represented within the authentication checking server 101 of FIG. 4), and returns the encrypted relay agent to the client machine 301 which has transmitted the resource request (S11 of FIG. 7).

The client machine 301 which has received the encrypted relay agent extracts the secret key of the user with the pass-phrase that the user has transmitted to the authentication checking server 101 at the time of the authentication checking, decrypts the encrypted relay agent 401 with the secret key (the key represented within the client machine 301 of FIG. 4), and executes the program of the relay agent (S12 of FIG. 7). In this case, the client application 302 run by the client machine 301 executes, for example, the program codes shown in steps 4 through 6 of FIG. 10. In step 4, it is determined whether or not the relay agent 401 has been received. In step 5, the relay agent 401 is decrypted. In step 6, the decrypted relay agent 401 is executed.

Figure 5:
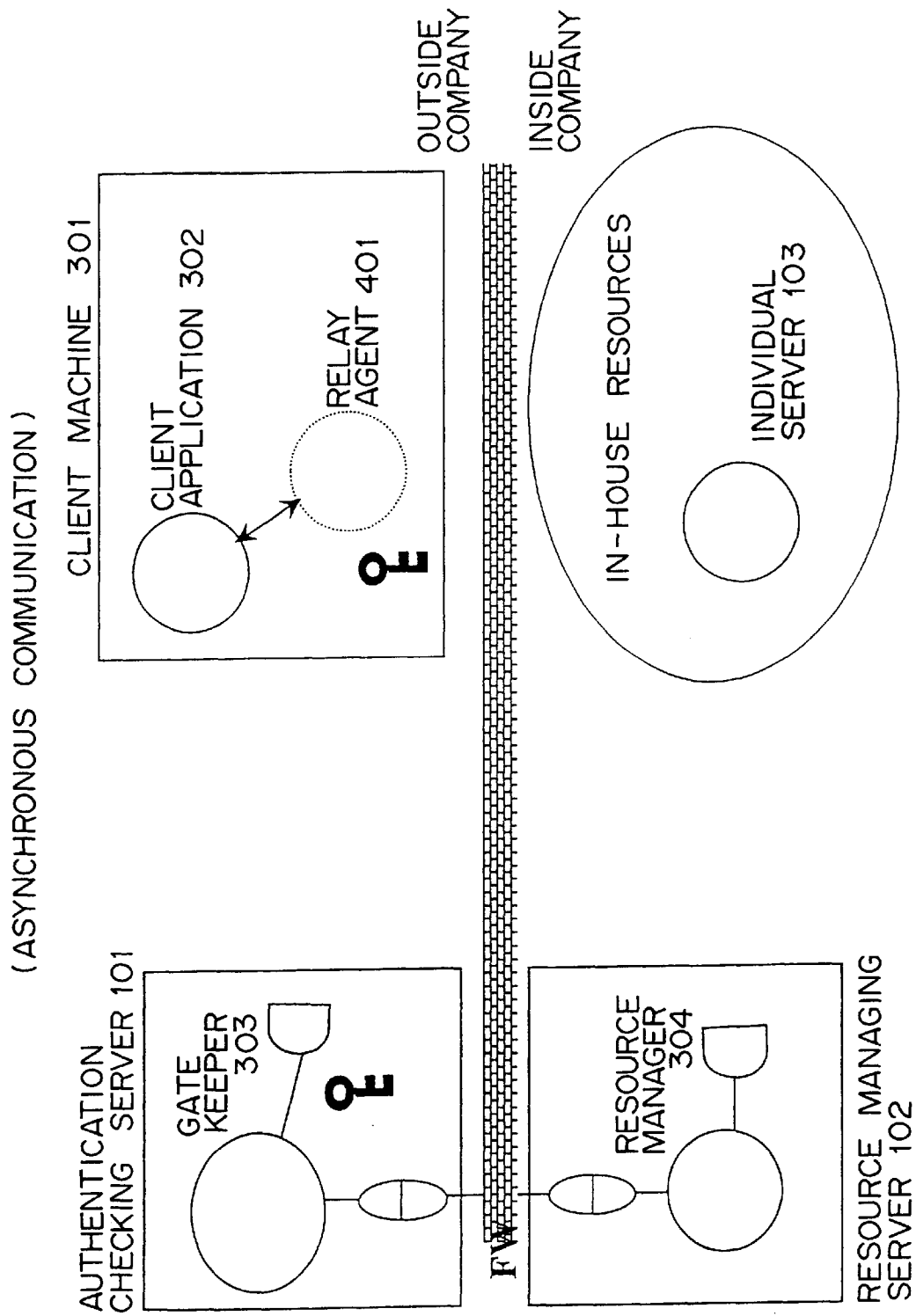
FIG. 5 is a schematic diagram explaining the operations according to the preferred embodiment of the present invention (No. 3)

Consequently, the in-house resource requested by the user is reproduced on the client machine 301. The user can access the in-house resource reproduced on the client machine 301 within the client machine 301 itself asynchronously to the individual server 103 included in the in-house network, as shown in FIG. 5.

The relay agent 401 executed by the client machine 0301 rejects an access request which violates the access right by referencing the access right and the client identification code, which are embedded in the agent 401 itself.

Figure 6:
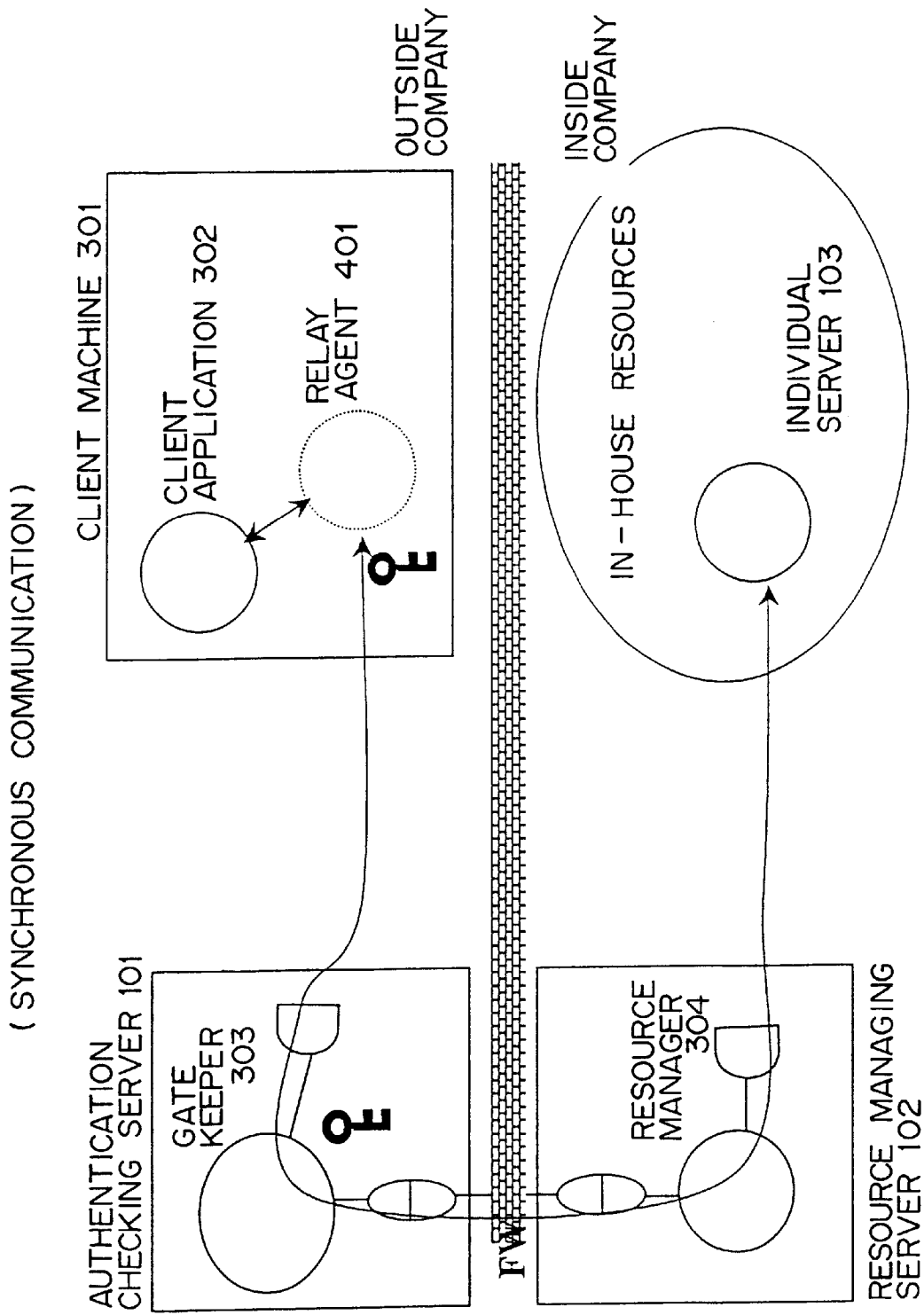
FIG. 6 is a schematic diagram explaining the operations according to the preferred embodiment of the present invention (No. 4)
Figure 8:
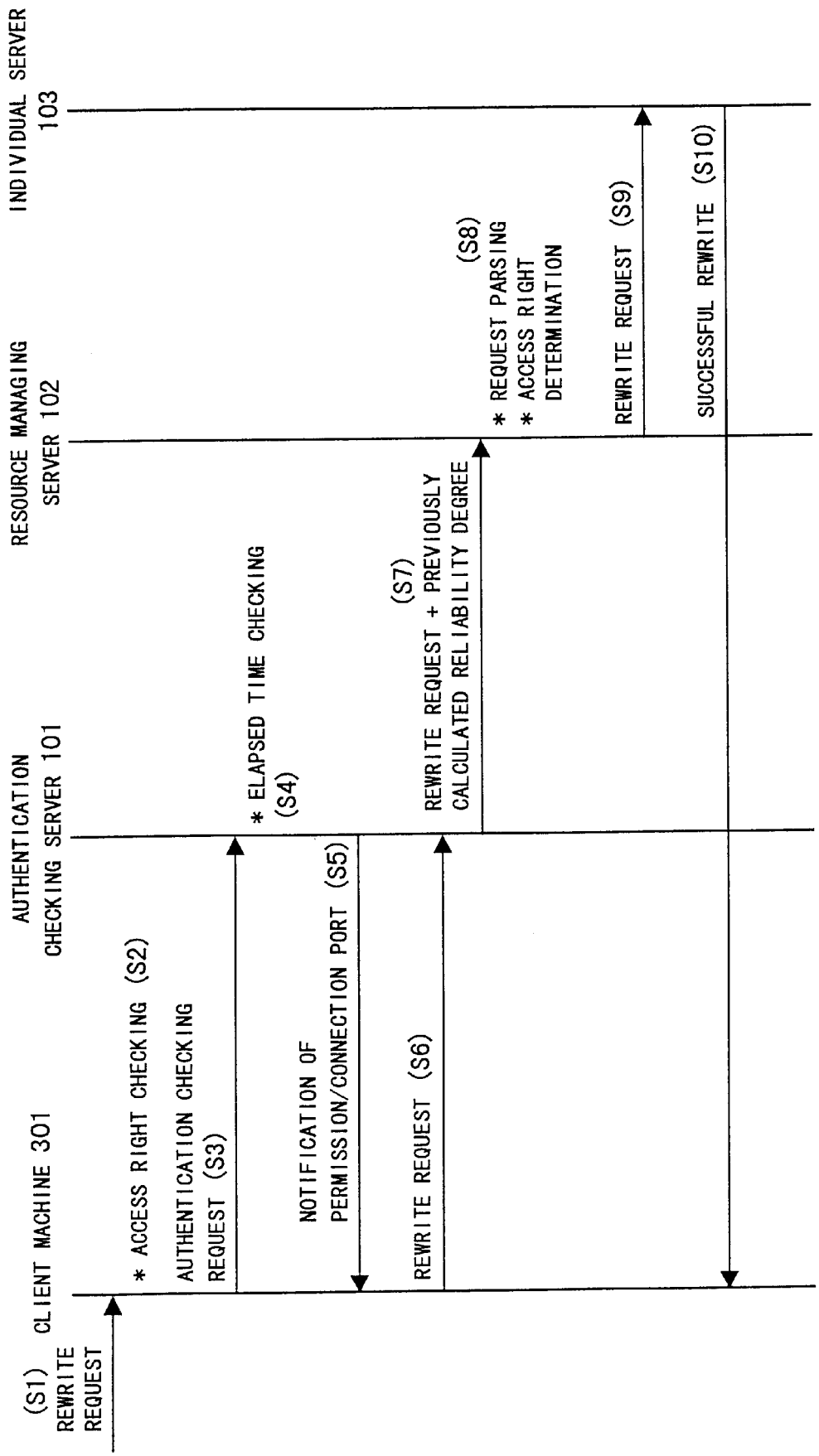
FIG. 8 shows the procedure sequence at an update (in the case where there is almost no time difference between when a resource is received and when a rewrite operation is performed)
Figure 9:
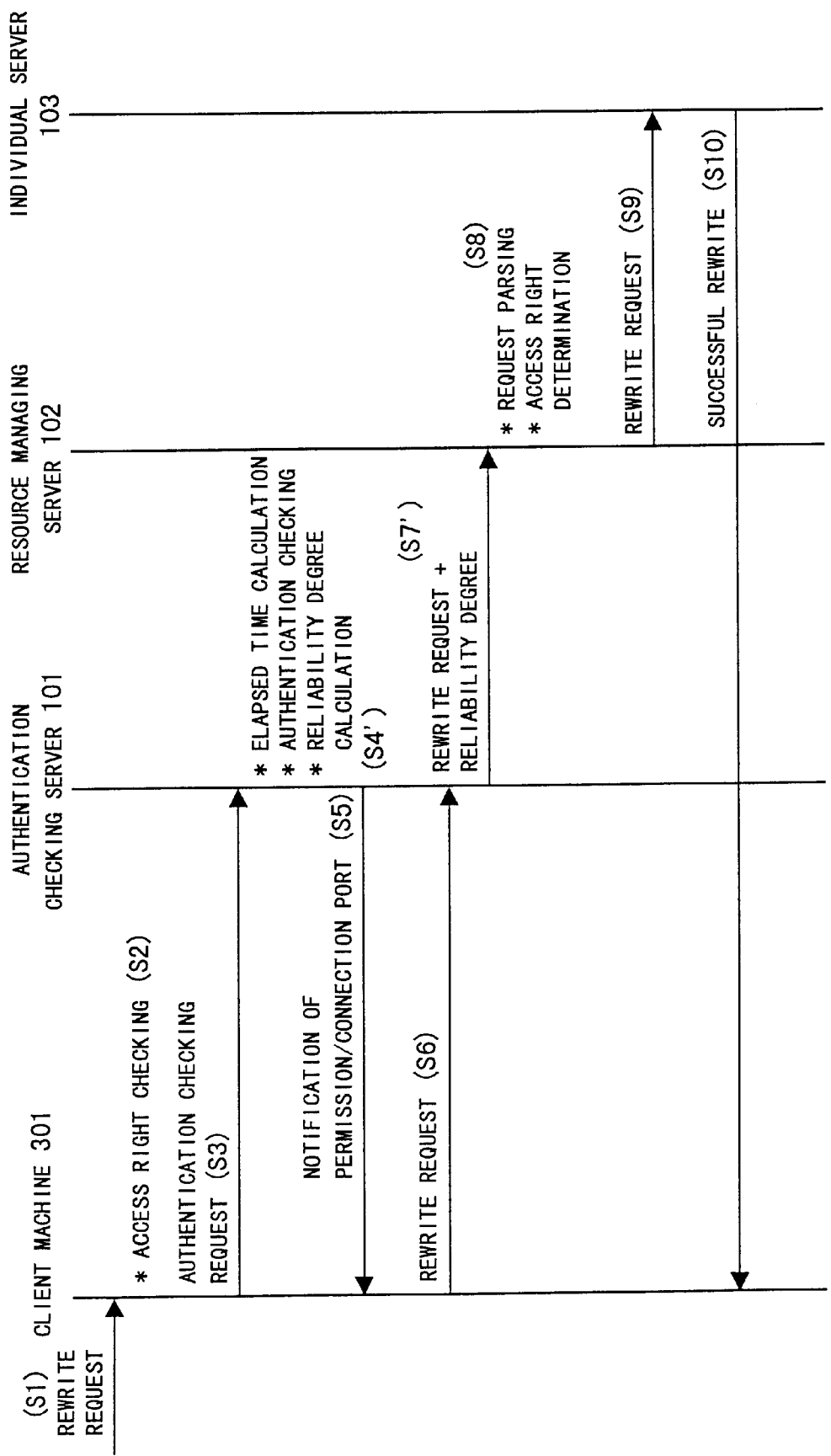
FIG. 9 shows the procedure sequence at an update (in the case where there is a time difference between when a resource is received and when a rewrite operation is performed)

Provided next is the explanation about the case where a data rewrite request to an in-house resource occurs within the client machine 301, by referring to the schematic diagram explaining the operations shown in FIG. 6 and the sequences shown in FIGS. 8 and 9. FIG. 8 shows the sequence used when there is almost no time difference between when an in-house resource is received by the client machine 301 and when a rewrite request is issued. FIG. 9 shows the sequence used when there is a time difference. The explanation will be provided by referring to both of FIGS. 8 and 9.

When a rewrite request occurs within the client machine 301 (S1 of FIG. 8 or 9), the relay agent 401 executed by the client machine 301 checks the access right of the user who has issued the request according to the code included in the request (S2 of FIG. 8 or 9).

If the access is permissible, the relay agent 401 issues an authentication checking request to the authentication checking server 101 (S3 of FIG. 8 or 9. This authentication checking request includes a user ID and an authentication password in a similar manner as in S1 of FIG. 7).

Upon receipt of the user ID and the authentication password from the client machine 301, the gate keeper 303 included in the authentication checking server 101 checks an amount of time elapsed from the connection start of the corresponding the user (S4 of FIG. 8 or S4' of FIG. 9).

If the amount of elapsed time is equal to or smaller than a predetermined amount, and if the permission/connection port (refer to S3 of FIG. 7) for accepting the resource request from the user is still open, the gate keeper 303 notifies the client machine 301 of this permission/connection port (S5 of FIG. 8).

If the amount of elapsed time is longer than a predetermined amount, and if the permission/connection port for accepting the resource request from the user is closed, the gate keeper 303 performs the authentication checking and the reliability degree calculation process in the similar manner as in S2 of FIG. 7 (S4' of FIG. 9), and notifies the client machine 301 of the resultantly secured permission/connection port (S5 of FIG. 9).

When the permission/connection port is notified from the authentication checking server 101, the relay agent 401 executed by the client machine 301 assembles the rewrite request in a predetermined data format in a similar manner as in S4 of FIG. 7, extracts the secret key of the user with the pass-phrase that the user has transmitted to the authentication checking server 101 at the time of the authentication checking, and encrypts the rewrite request including a new content to be rewritten to an in-house resource by using the secret key. Next, the relay agent 401 transmits the encrypted rewrite request by using the notified port (S6 of FIG. 8 or 9).

The relay server executed by the authentication checking server 101 decrypts the encrypted rewrite request received from the client machine 301 with the public key corresponding to the user who has transmitted the request, embeds in the decrypted rewrite request the degree of reliability, which was previously (in the case shown in FIG. 8) or is newly (in the case shown in FIG. 9) calculated, and transmits the rewrite request to the resource managing server 102 (S7 of FIG. 8 or 9).

Upon receipt of the rewrite request from the authentication checking server 101, the resource manager 304 operated by the resource managing server 102 parses this request, extracts the resource name and the degree of reliability of the user, and calculates the access right to the resource by using the extracted information in a similar manner as in S6 of FIG. 7 (S8 of FIG. 8 or 9).

The resource managing sever 102 searches for the individual server 103 which provides the network service corresponding to the parsed rewrite request, and transmits the parsed rewrite request and the access right to the searched individual server 103 (S9 of FIG. 8 or 9).

The individual server 103 which has received the rewrite request and the access right from the resource managing server 102 rewrites the content included in the rewrite request to the in-house resource based on the access right.

When the rewrite operation is successfully performed, the notification of the success of the rewrite operation is returned from the individual server 103 to the client machine 301, and the rewrite process is completed (S10 of FIG. 8 or 9).

The relay agent 401 executed by the client machine 301 automatically terminates its process, if the amount of elapsed execution time exceeds the expiry date set within the relay agent 401 itself.

What is claimed is:

1. A network connection controlling method for interconnecting an external network and a local area network, comprising:
    making authentication checking for a user within the external network when the user accesses the local area network;
    is receiving a resource request to access a resource within the local area network from the user based on a result of the authentication checking;
    calculating an access right to the resource within the local area network, which is requested by the resource request, based on the resource request and the result of the authentication checking; and accessing the resource based on the calculated access right,
    wherein users are filtered as a first priority and services are filtered as a second priority.

2. The method according to claim 1, further comprising:
    transmitting the accessed resource to a client device operated by the user as a mobile code including a program for accessing data included in the resource; and
    accessing the data included in the resource by receiving and executing the mobile code.

3. The method according to claim 2, further comprising:
    embedding an access control code which is based on the result of the authentication checking in the access program included in the mobile code; and
    controlling an access that the client device makes to the data included in the resource based on the access control code.

4. The method according to claim 2, further comprising:
    embedding an expiry date control code in the mobile code; and
    controlling a time period during which the client device can execute the mobile code based on the expiry date control code.

5. The method according to claim 2, further comprising:
    including the mobile code as a relay agent which implements a communication between a resource reproduction on the client device when the mobile code is executed by the client device, and a resource of a distribution source, which corresponds to the mobile code; and
    encrypting the communication between the resources.

6. The method according to claim 2, further comprising:
    issuing a rewrite request to a resource of a distribution source by using a degree of reliability of the user, when the resource is updated by the client machine.

7. The method according to claim 1, further comprising:
    communicating each of a plurality of types of resource requests based on a predetermined data format by using a single communications port.

8. A method for making an access from a client to a resource of an individual server, comprising:
    accessing the resource, by the client, by receiving from the server the resource to be accessed as an encrypted mobile code including data within the resource and a program for accessing the data; and
    accessing the resource, by the client, by executing the received mobile code,
    wherein users are filtered as a first priority and services are filtered as a second priority.

9. The method according to claim 8, comprising:
    arranging an authenticating server between an external client and the individual server;
    transmitting an ID and a password to the authenticating server; and
    receiving a port number corresponding to the individual server if authentication is successfully made, and requesting the mobile code by using the port number.

10. A method for connecting a client and a server, comprising:
    making authentication checking upon receipt of an authentication request from the client;
    calculating a degree of reliability of a user;
    opening a port corresponding to an individual server in response to a resource request issued form the client; and
    notifying the client of the port number for transmitting a request to the individual server, and then relaying a resource of the individual server as a mobile code composed of data included in the resource and a program for accessing the data,
    wherein users are filtered as a first priority and services are filtered as a second priority.

11. A method for connecting a client and an individual server, comprising:
    managing the individual server by parsing a resource request upon receipt of the resource request from the client;
    calculating an access right corresponding to the individual server;
    transmitting the request to the individual server when a permitted access right is obtained; and
    returning a requested resource as a mobile code composed of resource data and an access program to the client,
    wherein users are filtered as a first priority and services are filtered as a second priority.

12. A network connection controlling system for interconnecting a client device within an external network and a resource providing server within a local area network, comprising:

an authentication checking server device for making authentication checking for a user of the client device within the external network, when the user accesses the resource providing server device within the local area network; and a resource managing server device for receiving a resource request to access a resource provided by said resource providing server device from the user based on a result of the authentication checking, for calculating an access right to the resource which is provided by said resource providing server device and is requested by the resource request, based on the resource request and the result of the authentication checking, and for relaying the resource request and the access right to said resource providing server device, wherein users are filtered as a first priority and services are filtered as a second priority.

13. A computer-readable storage medium storing a program which directs a computer to perform a network connection controlling process for interconnecting an external network and a local area network, the process comprising:

making authentication checking for a user within the external network, when the user accesses the local area network;

receiving from the user a resource request to access a resource within the local area network based on a result of the authentication checking;

calculating an access right to the resource within the local area network, which is requested by the resource request, based on the resource request and the result of the authentication checking; and accessing the resource based on the calculated access right, wherein users are filtered as a first priority and services are filtered as a second priority.

* * * * *